United States Patent
Jeon et al.

(10) Patent No.: US 7,725,532 B2
(45) Date of Patent: May 25, 2010

(54) SYSTEM AND METHOD FOR PROVIDING FLEXIBLE CONTEXT-AWARE SERVICE

(75) Inventors: Hae Sook Jeon, Daejeon (KR); Kyung Hee Lee, Daejeon (KR); Seung Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 287 days.

(21) Appl. No.: 11/861,606

(22) Filed: Sep. 26, 2007

(65) Prior Publication Data

US 2008/0077661 A1 Mar. 27, 2008

(30) Foreign Application Priority Data

Sep. 27, 2006 (KR) .................... 10-2006-0094183

(51) Int. Cl.
G06F 15/16 (2006.01)
(52) U.S. Cl. .................................... 709/203; 707/104.1
(58) Field of Classification Search ........................ None
See application file for complete search history.

(56) References Cited

U.S. PATENT DOCUMENTS

| 7,092,943 | B2 | 8/2006 | Roese et al. | |
|---|---|---|---|---|
| 2003/0095524 | A1* | 5/2003 | Stephens et al. | 370/338 |
| 2004/0015484 | A1* | 1/2004 | Debaty | 707/3 |
| 2004/0141601 | A1* | 7/2004 | Cai et al. | 379/114.2 |
| 2005/0262042 | A1 | 11/2005 | Kondo | |
| 2005/0276246 | A1* | 12/2005 | Walker et al. | 370/329 |
| 2006/0020633 | A1* | 1/2006 | Cho | 707/104.1 |
| 2006/0126601 | A1* | 6/2006 | Kim et al. | 370/352 |
| 2006/0149905 | A1 | 7/2006 | Park et al. | |

FOREIGN PATENT DOCUMENTS

| EP | 1396986 | 3/2004 |
|---|---|---|
| KR | 1020060009788 | 2/2006 |
| KR | 1020060040117 | 5/2006 |
| KR | 1020060057924 | 5/2006 |
| KR | 1020060068518 | 6/2006 |
| WO | WO 03/094030 | 11/2003 |

OTHER PUBLICATIONS

Dey et al., "Designing mediation for context-aware applications", ACM Trans. Comput.-Hum. Interact. 12, 1 (Mar. 2005), pp. 53-80.*
Kagal et al., "Centaurus: an infrastructure for service management in ubiquitous computing environments", Wirel. Netw. 8, 6 (Nov. 2002), pp. 619-635.*
Notice of Allowance for Korean App. 10-2006-0094183.

* cited by examiner

*Primary Examiner*—Wing F Chan
*Assistant Examiner*—Kostas Katsikis
(74) *Attorney, Agent, or Firm*—Lowe Hauptman Ham & Berner LLP

(57) ABSTRACT

Provided are a system and method for determining whether to provide service and a content of the service based on ubiquitous-based context information. The method includes the steps of registering at least one context-aware service (CAS); determining whether sensors associated with the CAS are registered; when all the sensors are registered, checking all contexts associated with the CAS; upon receipt of a CAS request, receiving context information from the sensors and determining whether the context information satisfies the contexts; and providing the CAS if the context information satisfies at least one of the contexts. With the flexible engine determining whether to provide service corresponding to a current context even though all context information constituting the CAS is not collected, information is quickly provided upon receipt of a service request from a user.

9 Claims, 6 Drawing Sheets

SYSTEM AND METHOD FOR PROVIDING FLEXIBLE CONTEXT-AWARE SERVICE

CROSS-REFERENCE TO RELATED APPLICATION

This application claims priority to and the benefit of Korean Patent Application No. 2006-94183, filed Sep. 27, 2006, the disclosure of which is incorporated herein by reference in its entirety.

BACKGROUND

1. Field of the Invention

The present invention relates to context information service, and more particularly, to a system and method for determining whether to provide service and a content of the service based on ubiquitous-based context information.

2. Discussion of Related Art

As the information industry and mobile communication technology are being constantly developed, new mobile devices or information consumer-electronic products appear, computer systems are networked for convenience and diversity in people's lives, and communication and computing is possible almost anywhere, at anytime. The computing systems share information and cooperate with one another, resulting in ubiquitous computing phenomenon for new services.

The term ubiquitous means "present everywhere" or "present in several places simultaneously." In general, ubiquitous refers to natural resources, such as water or air, or gods of a religion existing whenever and wherever, for example. In the field of information and communication technology, the meaning of ubiquitous can include "ubiquitous computing" or "ubiquitous network" as a new IT environment or paradigm. Simply speaking, ubiquitous communication or ubiquitous computing refers to embedding a computer into common objects such as cups, cars, glasses and shoes in order to allow the objects to communicate with one another, not necessarily providing additional functions to a current computer or inserting something into the computer. Convenient and portable post-personal computer (PC) products are systems capable of processing information without restrictions of time and space, such as next-generation information devices including personal digital assistants (PDAs), Internet televisions (TVs), and smart phones, which allow processing of specialized tasks and processing information via a wireless communication network, such as wireless Internet. With the development of related techniques and products, ubiquitous computing is expected to gradually spread. In the future, a computer such as a microprocessor will be embedded in circumferential objects, including cars, glasses, pictures, walls, bottles, drugs, and waste, as well as electronic products, such that computing is non-visually realized through communication and cooperation.

User's circumferential elements, such as current location, ID, computer's unique number, behavior, and task may be called an object. Further, information about a user or a user's object and a change in the information may be called a context. For example, information needed for computing from a user circumference such as personal information, current time, season, and temperature may be called a context. A process of obtaining such context information from the user circumference is called context-awareness. When objects are discovered, context information obtained from the objects may be used by a current system or may be stored in a server or used at other places via a network. The context information stored in the server may be used or executed by other terminals connecting to a ubiquitous network.

A conventional context-aware technique is disclosed in the proceedings of "Improving Level of Service for Mobile Users Using Context-Awareness" issued by "P. Couder and A. M. Kermarrec" in IEEE Symposium on Reliable Distributed System pp. 24-33, 1999. This proceeding suggests a mode representing a contextual object (CO) in order to process context awareness.

FIG. 1 is a diagram illustrating the configuration of a conventional context-aware system.

Referring to FIG. 1, the system includes a client 100 and a server 200. The server 200 serves as an information server to store and manage contextual objects and respond to a request from the client 100.

The client 100 includes a detection/notification layer 130 for detecting a situation and notifying a high-level layer of the situation by monitoring the system and a network, an adaptation layer 120 for instructing to select and store context information to be managed and processed, and an application layer 110 interworked with the adaptation layer 120.

The application layer 110 is the highest-level layer and shows a processing result dependent on a context in an adaptive system and sends attribute information to a context manager 122.

In the adaptation layer 120, a contextual object manager 121 manages a data structure for all information about contextual objects currently used by each application, and the context manager 122 receives information about a context change in a current circumference when the detection/notification layer 130 detects the context change. A selection manager 123 filters unnecessary information so that an optimal result is obtained from a current context based on inclination or preference contained in a user profile.

The detection/notification layer 130 detects a change in the context of the system or network dependent on a user's interests and a circumferential environment, converts low-level information to a high-level event, and notifies the adaptation layer 120 of the high-level event.

For example, when the contextual object is defined for a user's ID, the context-aware system can select a proper circumference depending on a user's location, a language, a browser type, and a communication circumference, and show a suitable web document to the user.

This conventional technique suggests the structure of the context-aware system, but it suggests neither an explicit client-side process, a structure of a context-aware server, a context information storing method, nor a searching module. Furthermore, the conventional technique has neither a client-server communication capability nor a proxy module function, and thus is unable to perform sufficient retransmission and caching upon network failure.

Another conventional technique is disclosed in the proceedings of "The anatomy of a Context-aware application" issued by "Aby Harter, Any Hopper, Pete Steggles, Andy Ward, and Paul Webster", Wireless Networks Vol. 8, Issue 2/3, pp. 187-197, 2002. This conventional technique suggests the structure of a system using the space information as in FIG. 2 in order to detect the location of a mobile terminal in a building.

FIG. 2 is a schematic diagram illustrating a conventional method for tracking a location of a terminal.

Referring to FIG. 2, a base station 310 can recognize movement of a mobile terminal 320 using receivers A, B and C, recognize a new location of the mobile terminal 320 using receivers C, D and E, and perform new processing corresponding to the new location. In this case, the base station uses only a space indexing system when confirming only a simple location of the mobile terminal, but accesses a database of a server when storing, reading and processing context information.

To solve problems with the system shown in FIG. 1 using space information as in FIG. 2, a system as shown in FIGS. 3 and 4 is suggested.

FIG. 3 is a diagram illustrating the configuration of a conventional system for providing ubiquitous-based context information providing service.

Referring to FIG. 3, the system includes sensor nodes 410, context-aware middleware 420 interworked with the sensor nodes 410 and connected to sensor networks, and a context-aware server 430 for providing an information providing service to a user based on information received from the context-aware middleware 420.

The sensor nodes 410 detect and collect a change in service circumference (context information such as location, temperature/humidity, facility utilization, and the like) in real time and send the detected change to the context-aware middleware 420 connected to the sensor network via ad-hoc routing configuration.

The context-aware middleware 420 sends to the context-aware server 430 a service context information storing request containing the user's context information from the sensor nodes 410 in order to store the user's context information in the context-aware server 430. The context-aware middleware 420 receives a service request from the user, checks the user's service preference, the state of the user's device, circumferential context information and the like, and requests the context-aware server 430 to provide the service.

The context-aware server 430 stores the user's context information resulting from the service context information storing request received via the context-aware middleware 420, and provides the service based on the stored user's context information in response to the service request received via the context-aware middleware 420.

The configuration of the sensor node will now be described in greater detail with reference to FIG. 4. FIG. 4 is a diagram illustrating details of a sensor node in a conventional system for providing ubiquitous-based context information providing service.

Refeffing to FIG. 4, the sensor node 410 includes a tag sensor 411 attached to a user or a device as a service object for sensing a user's situation in real time; detecting sensors 412 for sensing a signal from the tag sensor 411 to recognize the user's location, and routing active service data such as a service request from the user and passive service data without user's intervention such as illegal intrusion detection to a sink sensor 413; and the sink sensor 413 for collecting the active service data and passive service data from the detecting sensors 412, sending the data to the context-aware middleware 420, and controlling a state of the detecting sensors 412.

The tag sensor 411 is attached to the user or the device as a service object. The tag sensor 411 may be mounted inside or outside the device. In order to provide context-aware based service, a user's location is first recognized. The location is recognized by calculating a coordinate using information communicated between the tag sensor 411 attached to the user and the detecting sensor 412 attached to the building. Specifically, the detecting sensor 412 sends a signal to any of the tag sensors 411 through wireless communication such as ZIGBEE® communication and super-broadband wireless communication, and the tag sensor 411 calculates its own location coordinate using location information received from three or more detecting sensors 412 and returns the location coordinate to the detecting sensor 412 so that the context-aware server 430 recognizes the location.

On the contrary, the tag sensor 411 may send a signal to the external detecting sensor 412 and the detecting sensors 412 may calculate the location using the signal. In this case, the location information of the tag sensor 411 is one of contexts, i.e., context information in the sensor network.

The context information refers to any type of information that characterizes existence (e.g., people, places, and objects) associated with interaction between a user and an object, as described above. The context information includes resource information from a user's terminal having a calculating capability and circumferential information varying with user's behavior.

The context information, including the location information from the tag sensors 412, is sent to the context-aware server 430 via the detecting sensors 412 in a network topology. In this case, when the detecting sensors 411 are able to process the collected context information, they may process the context information by themselves instead of sending it to the context-aware server 430.

Meanwhile, a network topology for delivering the collected context information from the tag sensor 411 is divided into a sensor layer including only the detecting sensors 412 for sensing information required for service, and a header sensor layer for summarizing sensed information according to a region, service, and network. The header sensor layer is selected from the above detecting sensor layers.

The information summarized by the header sensor is sent to the sink sensor 413, which serves as a gateway for connecting the sensor network to a context-aware system (i.e., the context-aware middleware and the context-aware server).

The sensors on the same layer freely communicate through wireless communication such as "RF", "ZIGBEE®" and "UWB", or through wired communication. The sensors may consist of a group and exchange a control message or data in the group, and a new sensor may be added to the group or any of the sensors may be removed from the group.

As described above, in the conventional technique, user's context information is collected in real time and used to provide optimized service to each user. However, in the case where user-requested service is associated with one or more contexts and there is at least one context, the service itself cannot be provided when the number of the context information for the requested service does not correspond to the number of context information defined for the service (due to malfunction, addition, or removal of any sensor).

SUMMARY OF THE INVENTION

The present invention is directed to a system and method for providing flexible context-aware service in which a determination is made as to whether service corresponding to a current context is provided even when all context information for a user-requested service is not collected.

One aspect of the present invention provides a system for providing flexible context-aware service (CAS), the system comprising: a flexible CAS estimation engine for determining that a client-requested CAS is to be provided if context information from sensors satisfies at least one of the contexts; and a context-aware server for allowing the flexible CAS estimation engine to determine whether to provide the CAS upon receipt of a CAS request from the client, and providing the CAS to the client depending on the determination.

Another aspect of the present invention provides a method for providing flexible context-aware service (CAS), the method comprising the steps of: (a) registering at least one CAS; (b) determining whether sensors associated with the CAS are registered; (c) when all the sensors are registered, checking all contexts associated with the CAS; (d) upon receipt of a CAS request, receiving context information from the sensors and determining whether the context information satisfies the contexts; and (e) providing the CAS if the context information satisfies at least one of the contexts.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Figure 1:
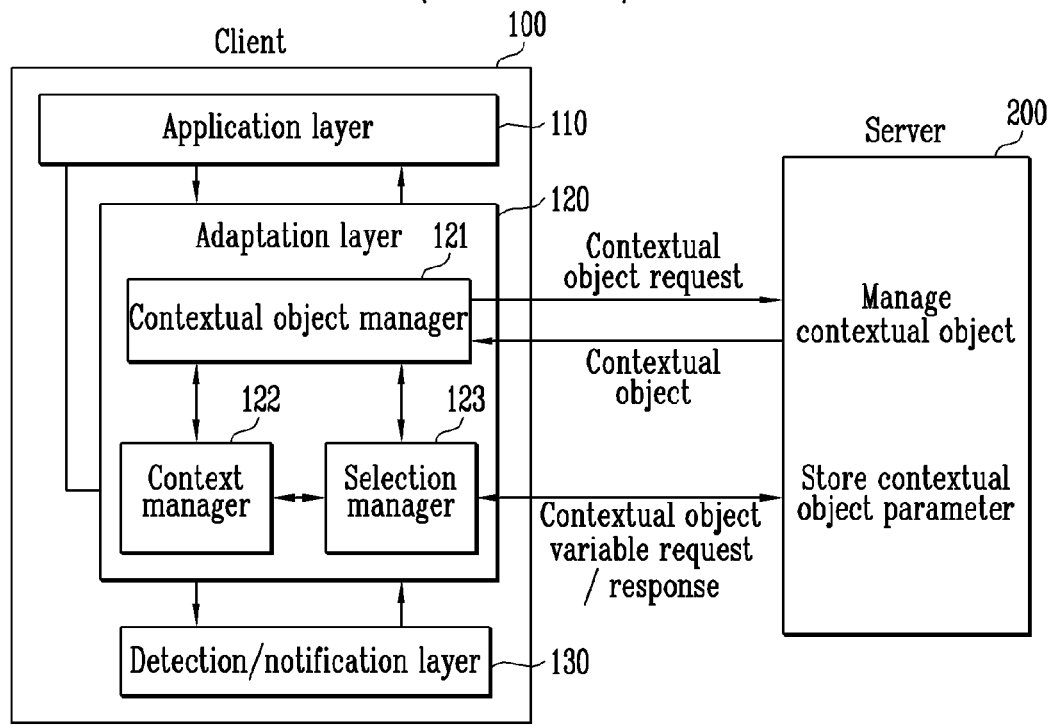
FIG. 1 is a diagram illustrating the configuration of a conventional context-aware system.
Figure 2:
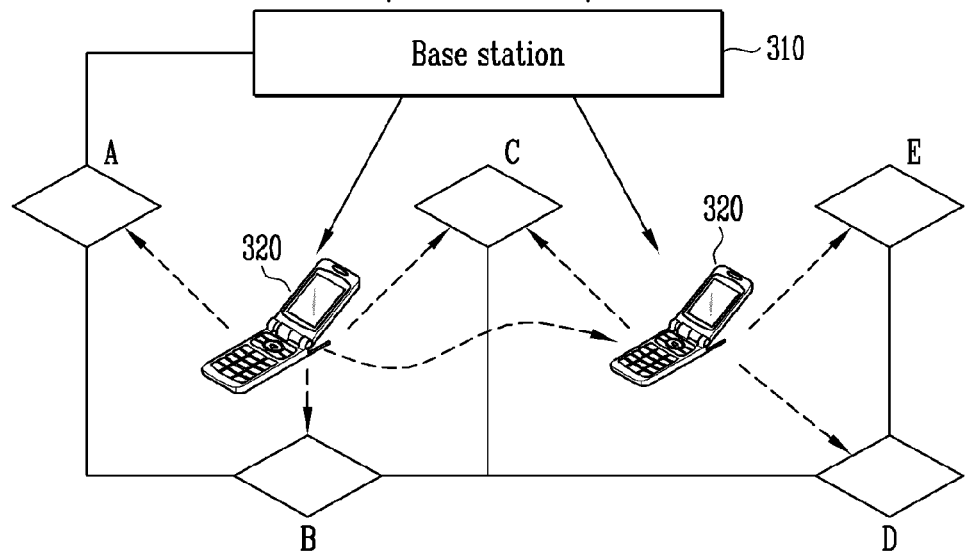
FIG. 2 is a schematic diagram illustrating a conventional method for tracking a location of a terminal.
Figure 3:
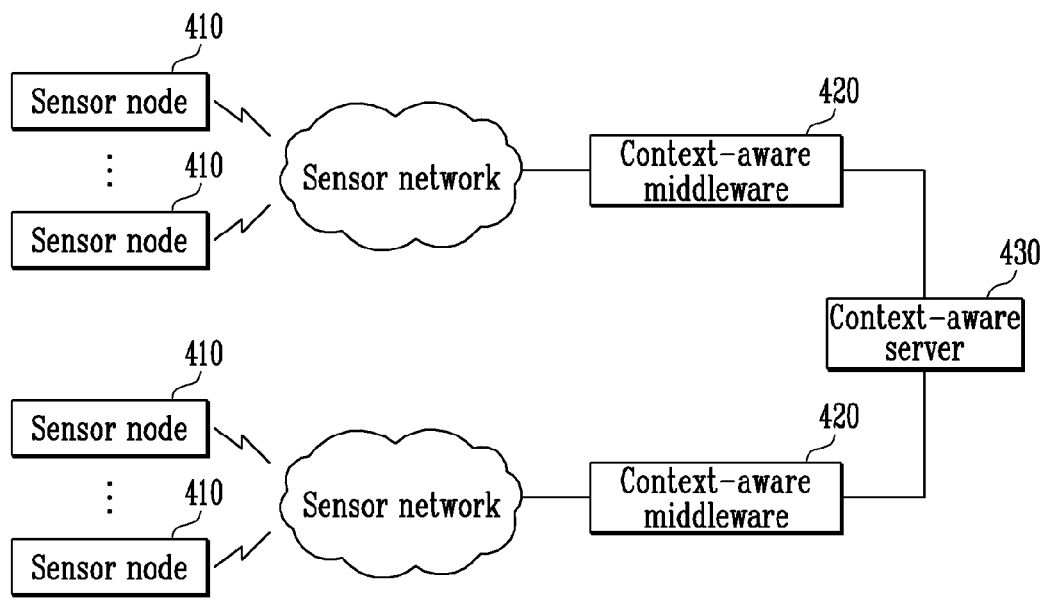
FIG. 3 is a diagram illustrating the configuration of a conventional system for providing ubiquitous-based context information providing service.
Figure 4:
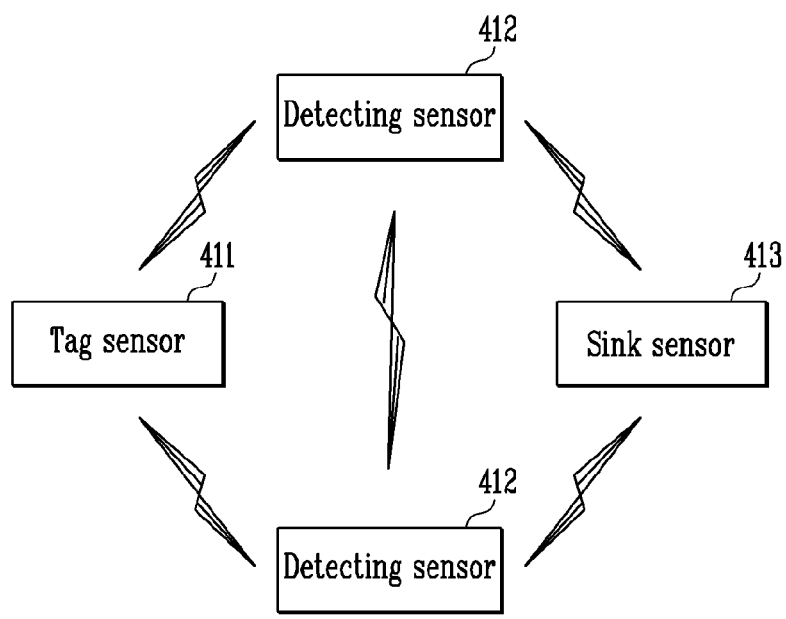
FIG. 4 is a diagram illustrating details of a sensor node in a conventional system for providing ubiquitous-based context information providing service.

Hereinafter, exemplary embodiments of the present invention will be described in detail. Like numbers refer to like elements throughout the specification. In particular, a service system according to the present embodiment is based on the system for providing ubiquitous-based context information service as shown in FIGS. 3 and 4 and the present invention will be described with reference to FIGS. 3 and 4.

When context-aware service (CAS) exists and one CAS consists of one or more context, related CASs, or a group of new context information for the related CAS used to determine a content of service depending on ubiquitous-based context information, a conventional technique provides the context-aware service when all context information are collected. However, in the present invention, even though all context information is not collected, flexible context-aware service can be provided using a flexible context-aware estimation engine.

Figure 5:
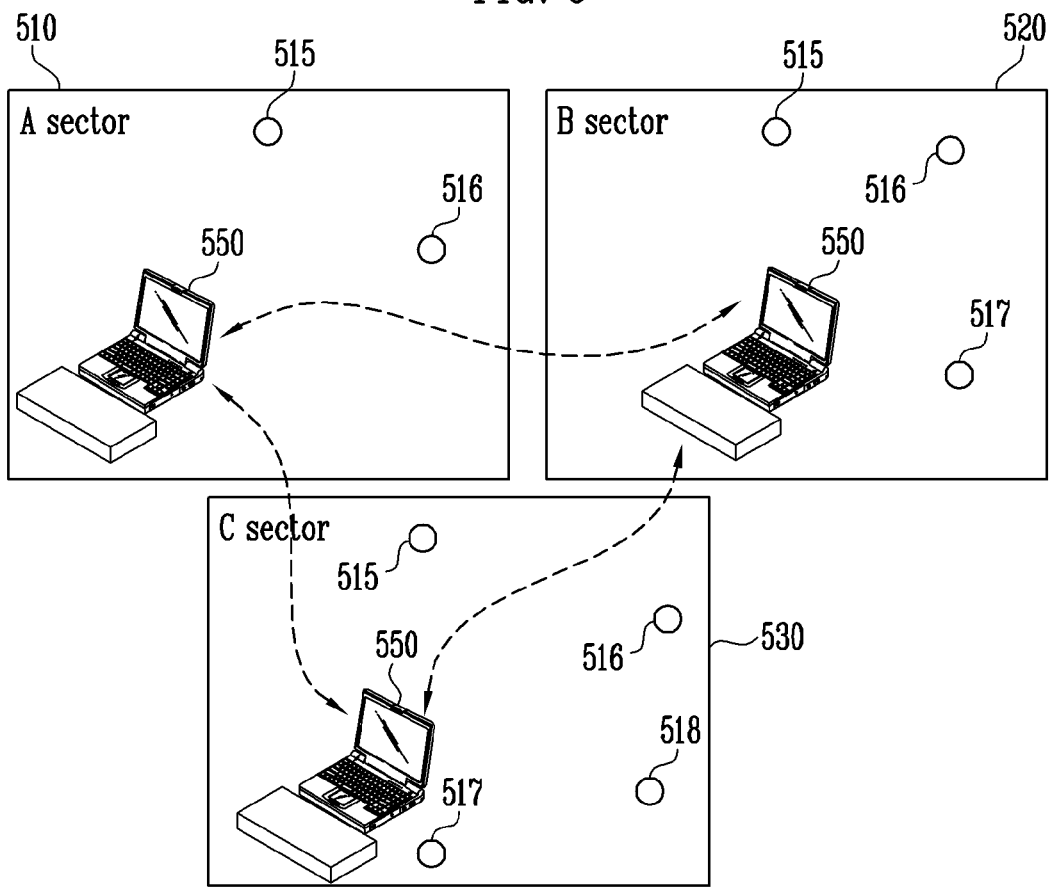
FIG. 5 is a schematic diagram illustrating a flexible context-aware service concept according to the present invention.

FIG. 5 is a schematic diagram illustrating a flexible context-aware service concept according to the present invention.

Referring to FIG. 5, when a mobile terminal 550 (e.g., a notebook computer, a mobile phone, etc.) is in area A, collected sensor information includes two pieces of sensor information from sensor nodes 515 and 516. When the mobile terminal 550 moves into region B, sensor information from a sensor node 517 is added. When the mobile terminal 550 moves into region C, sensor information from a sensor node 518 is added. When the mobile terminal 550 returns to area A, sensor information from the sensor nodes 517 and 518 disappear. In the case where context-aware application service is set to be provided only if the four information from the sensor nodes 515, 516, 517, and 518 are all satisfied, a user in area A or B is not provided with the service.

According to the present invention, the use of the flexible context-aware estimation engine allows seamless service to be provided even though the mobile terminal 550 moves through any region.

For example, it is assumed that the sensor nodes 515, 516, 517, and 518 sense time, temperature, and light. It is also assumed that requested CAS is a type of music, i.e., music A when a corresponding context indicates morning, music B when the context indicates morning and cool (20 to 25° C.), and music C when the context indicates morning, cool, and fine (e.g., 10 or more), and that one, two or three of the sensor nodes 515, 516, 517, and 518 are located in each location.

In this situation, when the mobile terminal 550 requesting music play moves, the user enjoys music A in area X, music B in area Y, and music C in area Z depending on the information sensed by the sensor nodes 515, 516, 517, and 518.

In providing such service, the number and type of sensor nodes may differ depending on the location of the mobile terminal 550 or on any defective sensor node. In this case, the number and state of the sensor nodes operating in that area may be checked using information about the location of the mobile terminal 550. It is possible to check if the sensor node is not providing context information even though the sensor node is powered on or the sensor node is defective.

The system and method for providing flexible context-aware service will now be described in greater detail with reference to the accompanying drawings.

Figure 6:
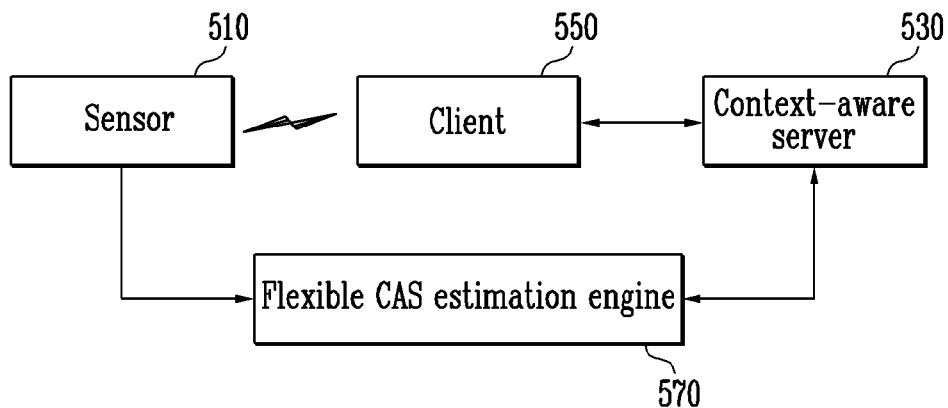
FIG. 6 is a diagram illustrating the configuration of a system for providing flexible context-aware service according to an exemplary embodiment of the present invention.

FIG. 6 is a diagram illustrating the configuration of a system for providing flexible context-aware service according to an exemplary embodiment of the present invention.

Referring to FIG. 6, the system includes at least one sensor 510, at least one client 550, a context-aware server 530, and a flexible CAS estimation engine 570.

The sensor 510 generates context information and provides it to the flexible CAS estimation engine 570. The sensor 510 is substantially similar in structure and operation with the sensor node 410 of FIG. 4, and thus a detailed description thereof will be omitted.

The flexible CAS estimation engine 570 receives the context information from the sensor 510 and determines whether the context information flexibly satisfies contexts in order to allow the context-aware server 530 to provide the CAS to the client. In particular, the flexible CAS estimation engine 570 allows the context-aware server 530 to provide the CAS to the client if the context information satisfies at least one of contexts. In this manner, it is possible to provide minimal seamless CAS.

The context-aware server 530 provides a CAS application to the client 550. In the present invention, the determination as to whether to provide the CAS is made using a flexible CAS estimation engine 570. In another embodiment, the flexible CAS estimation engine 570 may be one of components of the context-aware server 530.

Figure 7:
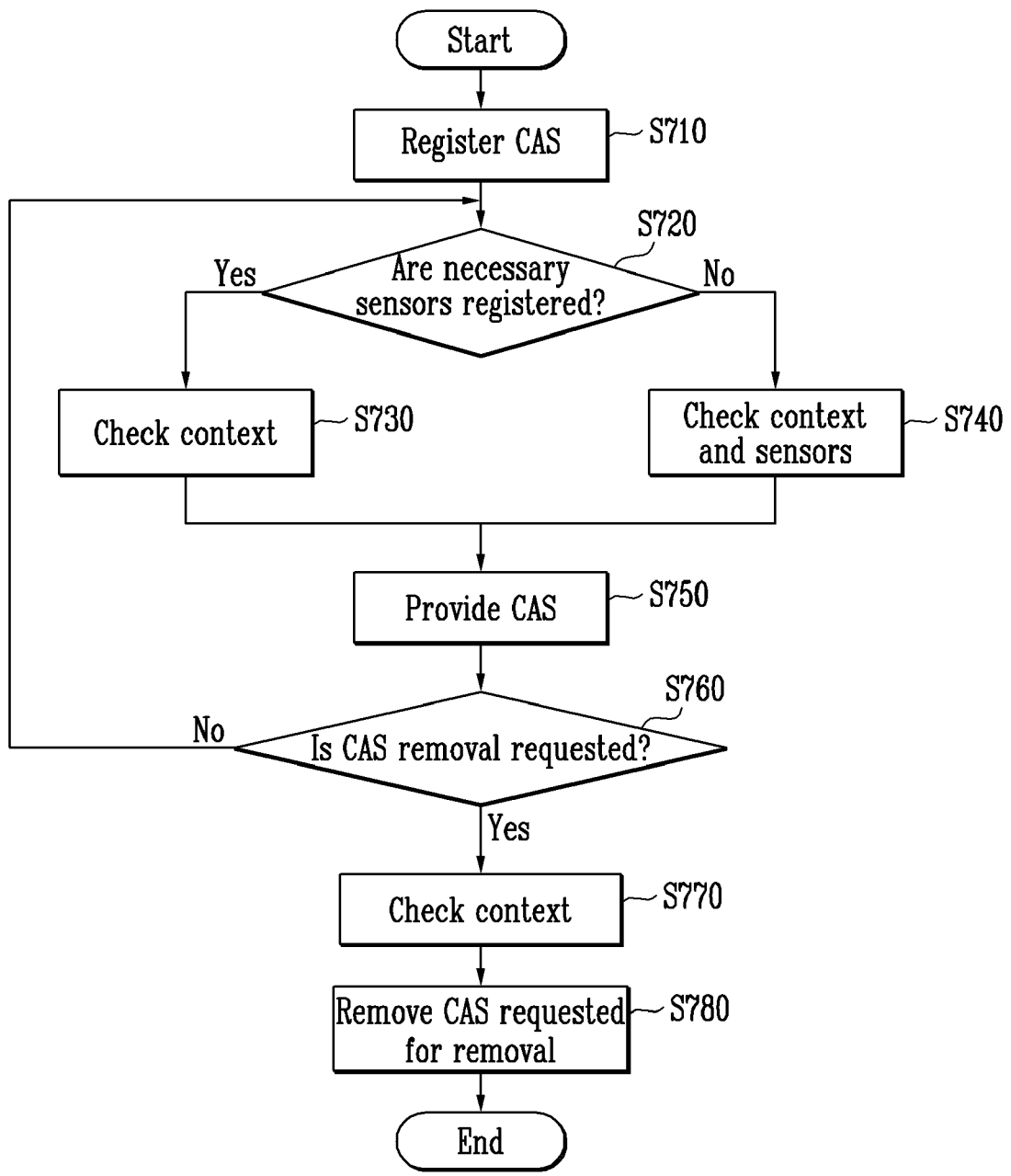
FIG. 7 is a flowchart illustrating a method for providing flexible context-aware service according to an exemplary embodiment of the present invention.

FIG. 7 is a flowchart illustrating a method for providing flexible context-aware service according to an exemplary embodiment of the present invention.

Referring to FIG. 7, context-aware service (CAS) is first registered in the context-aware server 530 through a client 550 or any of a range of multimedia tools, and a determination is made as to whether the necessary sensors 510 associated with the CAS are registered (S710 and S720).

If it is determined that all the sensors are registered, an identifier of the CAS is stored and contexts associated with the CAS are checked (S730). That is, a determination is made as to whether all contexts required for CAS are registered. In this case, default CAS associated with the CAS is assigned to each context so that flexible context-aware service is provided.

On the other hand, if at least one necessary sensor is not registered, an identifier of corresponding CAS is stored and CAS-related sensors and contexts are checked (S740). For example, since sensors corresponding to non-registered contexts are not registered, they can be registered later. When sensors are registered but defective, a corresponding context is not registered and a predefined error value is stored in the context so that the user manages it later. Furthermore, default CAS associated with the CAS is assigned to each context so that flexible context-aware service is provided.

In this manner, when checking sensors and/or contexts for one registered CAS is completed, a client-requested CAS is provided (S550). The CAS is provided by the flexible CAS estimation engine 570 according to the present invention, as described below in connection with FIG. 8.

Upon receipt of a CAS removal request via the client 550 or any of the range of multimedia tools, the context-aware server 530 checks the contexts to remove the CAS context (S760 and S770). When the CAS-related context is removed, a sensor corresponding to the context must be deregistered. When there is no removal request in step S760, the process returns to step S720.

The removal-requested CAS is removed (S780), and finally a life cycle for one CAS is terminated.

Figure 8:
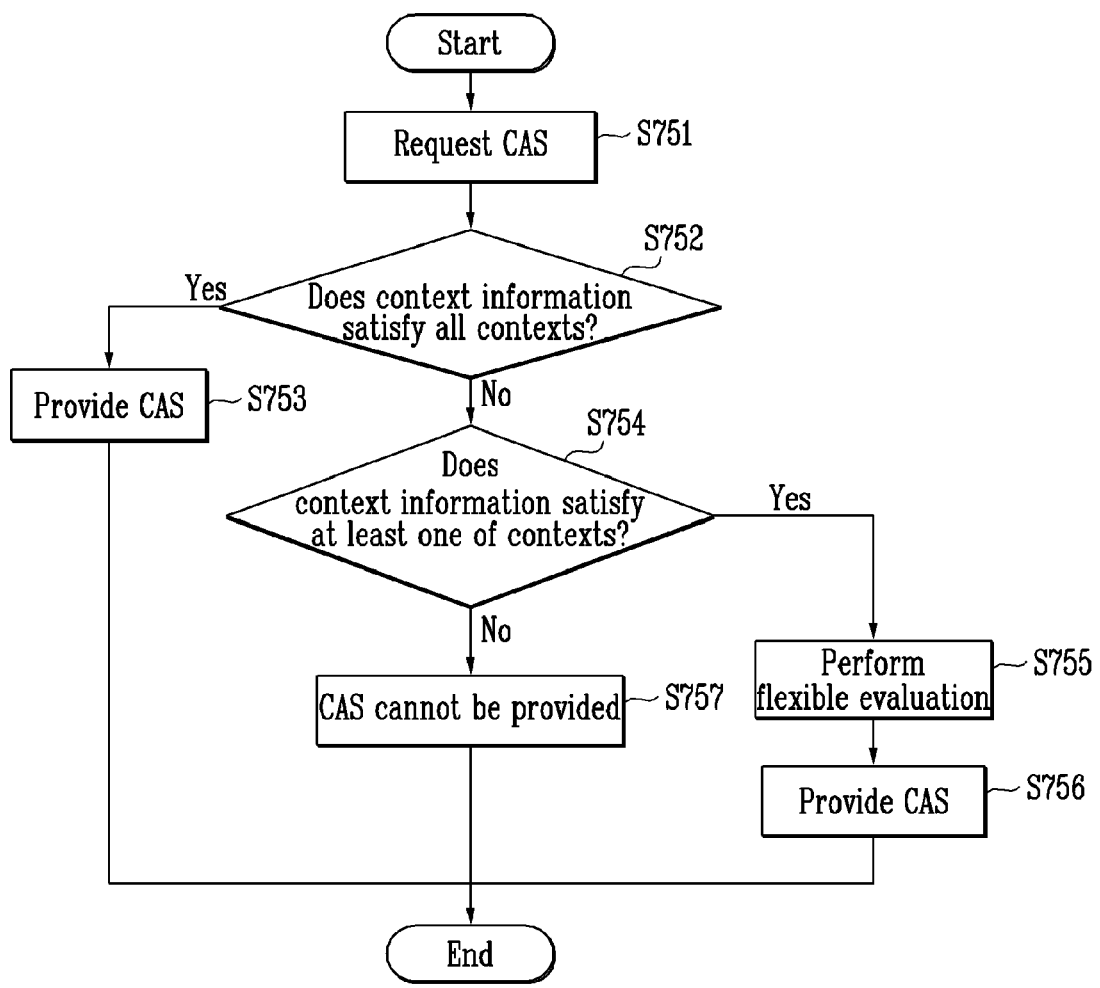
FIG. 8 is a flowchart illustrating a flexible context-aware service process according to the present invention.

FIG. 8 is a flowchart illustrating a flexible CAS process according to the present invention, in which step S750 of FIG. 7 will be described in greater detail.

Referring to FIG. 8, upon receipt of a CAS request from a client, a determination is made as to whether context information associated with the CAS satisfies all contexts (S751 and S752). For example, it is assumed that the context is set as "music Z in area A, morning, and raining" (in this case, "default music in area A and morning is set as music X, and default music in area A and raining is set as music Y"). In this case, upon a receipt of a CAS request for music, a determination is made as to whether context information indicating area A and morning and context information indicating rain satisfy all the contexts.

If it is determined in step S752 that the context information satisfies all the contexts, the requested CAS is provided to the client (S753). For example, when receiving context information indicating area A and morning and context information indicating rain from the sensor, the flexible CAS estimation engine 570 notifies the context-aware server 530 that the current context information satisfies the contexts so that the context-aware server 530 provides the CAS (i.e., music Z) to the client.

A determination is then made as to whether the context information associated with the CAS satisfies at least one of the contexts (S754). In a conventional technique, the CAS is not provided when the context information does not satisfy any one of the contexts, while in the present invention, the CAS can be provided if at least one piece of context information satisfies the context.

If it is determined in step S754 that the context information does not satisfy at least one context, the CAS cannot be provided. In this case, an apology message for non-provision of the service is forwarded. However, if the context information satisfies at least one of the contexts, the requested CAS is provided in a manner that performs flexible evaluation with the available current context information (S755 and S756). For example, when the context information indicates morning and no rain, a default music (music X) corresponding to the morning is provided as the CAS since current context information satisfies at least one context (i.e., the context information indicating morning satisfies some of the contexts upon receipt of a CAS request).

In this manner, even when the context information does not satisfy all client-requested conditions (i.e., contexts), minimal CAS can be seamlessly provided.

Figure 9:
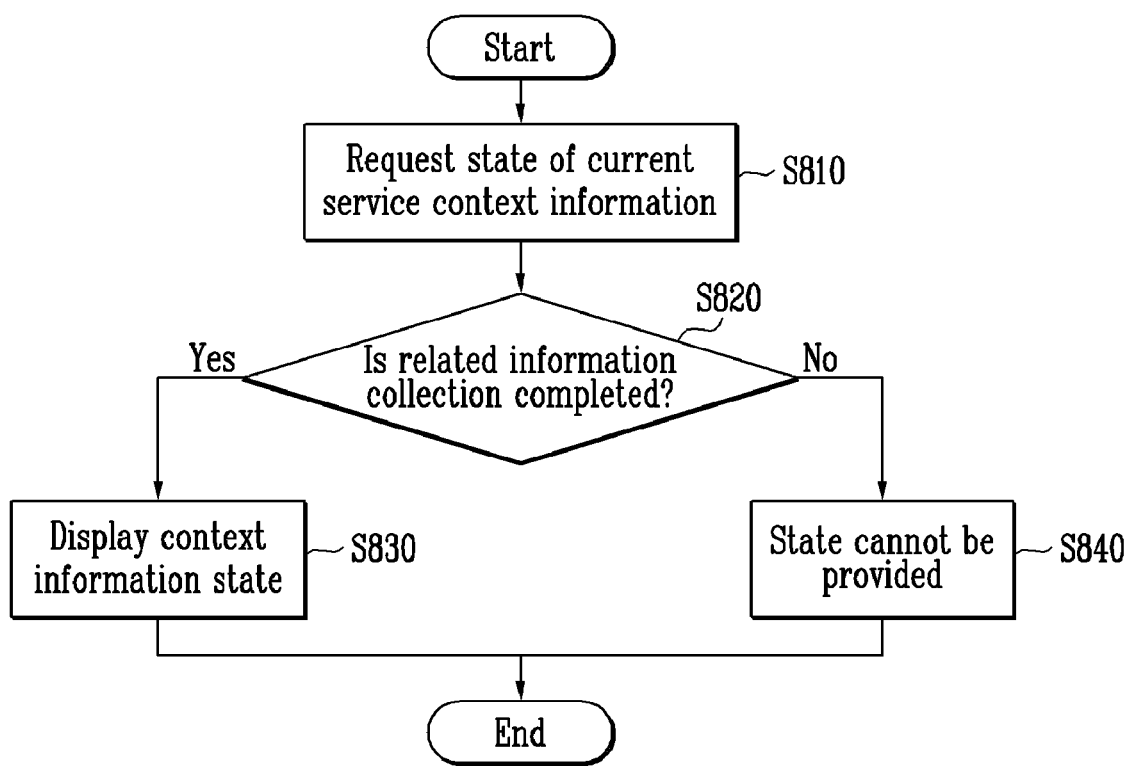
FIG. 9 is a flowchart illustrating a method for checking current context information upon receipt of a context-aware service request according to the present invention.

FIG. 9 is a flowchart illustrating a method for checking current context information upon receipt of a context-aware service request according to the present invention, in which when the CAS is not provided a cause thereof is notified to the client.

Referring to FIG. 9, when currently serviced contexts are desired to be checked, context information of current service is requested, associated information is collected, and a state of context information is displayed (S810 to S830).

However, when the associated information collection is not completed, the context information is not provided and a notice saying that "this area is not served" is forwarded (S840).

According to the present invention described above, with the flexible engine determining whether to provide service corresponding to a current context even though all context information constituting the CAS is not collected, it is possible to quickly provide information upon receipt of a service request from a user.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for providing flexible context-aware service (CAS ), the method comprising the steps of:
   (a) registering at least one context-aware service (CAS );
   (b) determining whether sensors associated with the CAS are registered;
   (c) when all the sensors are registered, checking all contexts associated with the CAS;
   (d) upon receipt of a CAS request, receiving context information from the sensors and determining whether the context information satisfies the contexts; and
   (e) providing the CAS if the context information satisfies at least one of the contexts;
   (f) upon receipt of a CAS removal request, removing the contexts and deregistering the sensors associated with the CAS; and
   (g) removing the CAS requested for removal.

2. The method of claim 1, wherein step (c) comprises the step of checking the CAS related sensors and the contexts when at least one of the sensors is not registered.

3. The method of claim 1, wherein step (c) comprises the step of, when the sensor is registered but defective, storing a predefined error value in the context associated with the sensor.

4. The method of claim 1, wherein step (c) comprises the step of assigning default CAS to each context.

5. The method of claim 1, wherein step (e) comprises the step of providing the CAS when the context information satisfies all the contexts.

6. The method of claim 1, wherein step (e) comprises the step of, when the context information does not satisfy any of the contexts, notifying that the CAS cannot be provided.

7. A system for providing flexible context-aware service (CAS), the system comprising:
- a flexible CAS estimation engine for determining that a client-requested CAS is to be provided if context information from sensors satisfies at least one of the contexts; and
- a context-aware server configured to provide the CAS to the client upon the determination of the flexible CAS estimation engine that context information from the sensors satisfies at least one of the contexts; wherein the context-aware server is further configured to remove the contexts, deregister sensors associated with the CAS, and remove the CAS, upon receipt of a CAS removal request.

8. The system of claim 7, wherein the flexible CAS estimation engine determines that the CAS is to be provided when the context information satisfies all the contexts.

9. The system of claim 7, wherein, when the context information does not satisfy any of the contexts, the flexible CAS estimation engine determines to forward a message of notifying that the CAS cannot be provided.

* * * * *